United States Patent
Oh et al.

(10) Patent No.: US 9,570,742 B2
(45) Date of Patent: Feb. 14, 2017

(54) POSITIVE ELECTRODE ACTIVE MATERIAL HAVING IMPROVED SAFETY AND LIFETIME CHARACTERISTICS AND LITHIUM SECONDARY BATTERY COMPRISING THE SAME

(71) Applicants: LG Chem, Ltd., Seoul (KR); Korea Advanced Institute of Science and Technology, Daejeon (KR); Industry Foundation of Chonnam National University, Gwangju (KR)

(72) Inventors: Song Taek Oh, Daejeon (KR); Ki Suk Kang, Daejeon (KR); Dong Hwa Seo, Busan (KR); Ji Hyun Hong, Daejeon (KR); Jae Kook Kim, Gwangju (KR)

(73) Assignees: LG Chem, Ltd. (KR); Korea Advanced Institute Of Science And Technology (KR); Industry Foundation Of Chonnam National University (KR)

( * ) Notice: Subject to any disclaimer, the term of this patent is extended or adjusted under 35 U.S.C. 154(b) by 280 days.

(21) Appl. No.: 14/018,003

(22) Filed: Sep. 4, 2013

(65) Prior Publication Data

US 2014/0000100 A1    Jan. 2, 2014

Related U.S. Application Data

(63) Continuation of application No. PCT/KR2012/007755, filed on Sep. 26, 2012.

(30) Foreign Application Priority Data

Sep. 26, 2011 (KR) .......................... 10-2011-0096893

(51) Int. Cl.
  *H01M 4/525*  (2010.01)
  *H01M 4/505*  (2010.01)
  (Continued)

(52) U.S. Cl.
  CPC .......... *H01M 4/505* (2013.01); *C01G 45/1228* (2013.01); *C01G 51/50* (2013.01);
  (Continued)

(58) Field of Classification Search
  CPC ...... H01M 4/505; H01M 4/364; H01M 4/485; H01M 4/525; H01M 4/5825; C01G 45/1228; C01G 51/50; C01G 53/50
  See application file for complete search history.

(56) References Cited

U.S. PATENT DOCUMENTS

2006/0093920 A1*  5/2006  Cheon ................... H01M 4/131
                                                                429/232
2006/0159994 A1   7/2006  Dahn et al.
  (Continued)

FOREIGN PATENT DOCUMENTS

CA    2791187 A1   9/2011
CN    101243565 A   8/2008
  (Continued)

OTHER PUBLICATIONS

Machine translation of JP 2002-100357 A.*
  (Continued)

*Primary Examiner* — Jonathan Jelsma
(74) *Attorney, Agent, or Firm* — Lerner, David, Littenberg, Krumholz & Mentlik, LLP

(57) ABSTRACT

Provided is a secondary battery comprising a positive electrode active material represented by the following Chemical Formula 1, $$Li\{Li_aMn_xM_{1-a-x-y}M'_y\}O_2 \quad \text{[Chemical Formula 1]}$$

where $0<a\leq0.2$, $x>(1-a)/2$, and $0<y<0.2(1-a)$, and M is simultaneously applied by any one element or two or more elements selected from the group consisting of group 3 and 4 elements, and M' is a metal having an ion diameter of 70 pm or more with an oxidation number
  (Continued)

of 4 as well as a six-coordinate octahedral structure (specifically, any one element or two or more elements selected from the group consisting of titanium (Ti), vanadium (V), and iron (Fe) are simultaneously applied). According to the present invention, a high capacity lithium secondary battery having improved safety and processability may be provided.

9 Claims, 2 Drawing Sheets

(51) Int. Cl.

| | |
|---|---|
| H01M 4/04 | (2006.01) |
| H01M 4/36 | (2006.01) |
| H01M 4/485 | (2010.01) |
| H01M 4/58 | (2010.01) |
| C01G 45/12 | (2006.01) |
| C01G 51/00 | (2006.01) |
| C01G 53/00 | (2006.01) |
| H01M 4/52 | (2010.01) |
| H01M 10/052 | (2010.01) |
| H01M 4/131 | (2010.01) |
| H01M 4/1391 | (2010.01) |
| H01M 4/62 | (2006.01) |

(52) U.S. Cl.
CPC .............. *C01G 53/50* (2013.01); *H01M 4/04* (2013.01); *H01M 4/364* (2013.01); *H01M 4/485* (2013.01); *H01M 4/525* (2013.01); *H01M 4/5825* (2013.01); *C01P 2002/50* (2013.01); *C01P 2002/52* (2013.01); *C01P 2006/40* (2013.01); *H01M 4/131* (2013.01); *H01M 4/1391* (2013.01); *H01M 4/52* (2013.01); *H01M 4/62* (2013.01); *H01M 10/052* (2013.01); *Y02P 70/54* (2015.11); *Y10T 29/49108* (2015.01)

(56) References Cited

U.S. PATENT DOCUMENTS

| | | |
|---|---|---|
| 2007/0037043 A1 | 2/2007 | Chang et al. |
| 2007/0042269 A1 | 2/2007 | Chang et al. |
| 2008/0280205 A1* | 11/2008 | Jiang .................... C01G 53/006 429/223 |
| 2010/0024204 A1 | 2/2010 | Min et al. |
| 2011/0305939 A1 | 12/2011 | Imanari et al. |
| 2011/0311869 A1* | 12/2011 | Oh ........................ H01M 4/131 429/211 |
| 2011/0311872 A1 | 12/2011 | Oh et al. |
| 2012/0015231 A1 | 1/2012 | Takamori et al. |
| 2012/0270107 A1* | 10/2012 | Toya .................... C01G 53/006 429/223 |
| 2013/0015396 A1 | 1/2013 | Terashima |

FOREIGN PATENT DOCUMENTS

| | | | | |
|---|---|---|---|---|
| EP | 1372202 A1 | 12/2003 | | |
| JP | 2001-023617 A | 1/2001 | | |
| JP | 2002-100356 A | 4/2002 | | |
| JP | 2002-100357 A | 4/2002 | | |
| JP | 2002-100358 A | 4/2002 | | |
| JP | 2004-538610 A | 12/2004 | | |
| JP | 2005-108682 A | 4/2005 | | |
| JP | WO 2006134833 A1 * | 12/2006 | ............. | H01M 2/16 |
| JP | 2009-505367 A | 2/2009 | | |
| JP | 2011-113792 A | 6/2011 | | |
| JP | 2011116580 A * | 6/2011 | | |
| JP | 2013-520783 A | 6/2013 | | |
| KR | 2004-0096203 A | 11/2004 | | |
| KR | 20070012213 A | 1/2007 | | |
| KR | 20070021955 A | 2/2007 | | |
| KR | 100718455 B1 | 5/2007 | | |
| KR | 20070102765 A | 10/2007 | | |
| KR | 100786968 B1 | 12/2007 | | |
| KR | 100793011 B1 | 1/2008 | | |
| KR | 100863735 B1 | 10/2008 | | |
| KR | 20100017344 A | 2/2010 | | |
| KR | 20110061204 A | 6/2011 | | |
| KR | WO 2011105832 A2 * | 9/2011 | ............ | H01M 4/131 |
| WO | 2010/098187 A1 | 9/2010 | | |
| WO | 2010/110403 A1 | 9/2010 | | |
| WO | 2011/114534 A1 | 9/2011 | | |

OTHER PUBLICATIONS

Search report from European Application No. 12837536.7, dated Jan. 26, 2015.
International Search Report for Application No. PCT/KR2012/007755 dated Jun. 2, 2013.

* cited by examiner

POSITIVE ELECTRODE ACTIVE MATERIAL HAVING IMPROVED SAFETY AND LIFETIME CHARACTERISTICS AND LITHIUM SECONDARY BATTERY COMPRISING THE SAME

CROSS-REFERENCE TO RELATED APPLICATIONS

This application is a continuation of International Application No. PCT/KR2012/007755 filed on Sep. 26, 2012, which claims priority from Korean Patent Application No. 10-2011-0096893 filed with Korean Intellectual Property Office on Sep. 26, 2011, the entire contents of which are incorporated herein by reference.

BACKGROUND OF THE INVENTION

Field of the Invention

The present invention relates to a positive electrode active material having improved safety and lifetime characteristics and a secondary battery comprising the same.

Description of the Related Art

Recently, in line with growing concerns about environmental issues, a significant amount of research into electric vehicles and hybrid electric vehicles capable of replacing vehicles using fossil fuels such as gasoline vehicles and diesel vehicles, one of major causes of air pollution, has been conducted. Although nickel-metal hydride secondary batteries have been mainly used as a power source of the electric vehicles and hybrid electric vehicles, research into using lithium secondary batteries having high energy density and discharge voltage as well as long cycle lifetime and low self-discharge rate has been actively conducted and some of the research are in a commercialization stage.

A carbon material is mainly used as a negative electrode active material of the lithium secondary batteries and the use of lithium or a sulfur compound is also considered. Also, lithium-containing cobalt oxide ($LiCoO_2$) is mainly used as a positive electrode active material and in addition, the use of lithium-containing manganese oxides, such as $LiMnO_2$ having a layered crystal structure or $LiMn_2O_4$ having a spinel crystal structure, and lithium-containing nickel oxide ($LiNiO_2$) is also considered.

$LiCoO_2$ among the positive electrode active materials is most widely used due to its excellent lifetime characteristics and charge-discharge efficiency. However, $LiCoO_2$ has limitations in massively being used as a power source for an industrial sector such as electric vehicles, because structural stability thereof may decrease and price competitiveness may be limited due to its high price according to the resource limitation of cobalt used as a raw material.

A $LiNiO_2$-based positive electrode active material is relative inexpensive and exhibits battery characteristics having high discharge capacity. However, rapid phase transition of its crystal structure may occur according to volume changes accompanied by a charge and discharge cycle, and stability may rapidly decrease when being exposed to air and moisture.

In contrast, since lithium manganese oxide has advantages in that resource thereof as a raw material is abundant and environmentally friendly manganese is used, lithium manganese oxide attracts great interests as a positive electrode active material capable of replacing $LiCoO_2$. In particular, spinel-structured lithium-containing manganese oxide has advantages in that thermal stability may be excellent, the price may be low, and synthesis may be facilitated. However, the spinel-structured lithium-containing manganese oxide has disadvantages in that capacity may be low, lifetime characteristics may be decreased due to a side reaction, and cycle characteristics and high-temperature storage characteristics may be poor.

As a result, layer-structured lithium-containing manganese oxide is suggested in order to compensate for the low capacity of spinel and secure excellent thermal safety of manganese-based active materials. In particular, layer-structured $xLi_2MnO_3(1-x)LiMO_2$ ($0<x<1$, M=Co, Ni, Mn, etc.) having a content of manganese (Mn) greater than those of other transition metal(s) has disadvantages in that initial irreversible capacity thereof may be relatively high. However, since relatively high capacity may be manifested during initial charge at a high voltage, layer-structured $xLi_2MnO_3(1-x)LiMO_2$ becomes a subject of active research as a positive electrode active material.

In the case that charging is performed at a relatively high voltage of 4.5 V (specifically, 4.4 V or more) based on an initial positive electrode potential, the lithium-containing manganese oxide exhibits high capacity reaching about 250 mAh/g as well as an excessive amount of gas, such as oxygen and carbon dioxide, being generated, while exhibiting a plateau potential range of 4.4 V to 4.8 V.

The plateau potential range and the generation of gas in characteristic features relating to structural changes in the material may also continuously occur in a subsequent cycle in the case that the plateau potential range and the generation of gas do not sufficiently occur during initial charge, i.e., a formation process.

Therefore, in order to obtain such a high capacity as above by using the layer-structured $xLi_2MnO_3(1-x)LiMO_2$ as a positive electrode active material, it may be essential to sufficiently perform a formation process at a voltage of 4.4 V or more based on the positive electrode potential as described above. However, since a side reaction, such as oxidation of an electrolyte, may be facilitated at a voltage of the plateau potential or more, conditions, such as formation voltage and time, may be inevitably limited. Therefore, since the initial formation is insufficiently performed, gas composed of oxygen and carbon dioxide is continuously released during a repetitive charge and discharge cycle, and thus, safety and lifetime characteristics of the battery may be decreased.

Accordingly, in Korean Patent Application Laid-Open Publication Nos. 10-2007-0012213 and 10-2007-0021955, methods of charging and discharging are disclosed, in which a formation process is performed at a high voltage during a first cycle, gas is then removed through a degassing process, and thereafter, a voltage is decreased to a level of an operating voltage of a general secondary battery (4.4 V or less). However, a phenomenon of having insufficient formation performed during initial charge is the same even by the foregoing methods, and as a result, gas is continuously generated during the use of the battery and low capacity is obtained in comparison to the case of performing a cycle at a high voltage of 4.5 V or more. Therefore, there is a continuous need for research into a technique for addressing the foregoing limitations.

Thus, with respect to a lithium secondary battery comprising the layer-structured lithium-containing manganese oxide $xLi_2MnO_3(1-x)LiMO_2$ as a positive electrode active material, there is a need to develop a technique for addressing the continuous generation of a large amount of gas during a cycle at a high voltage.

SUMMARY OF THE INVENTION

According to an aspect of the present invention, the inventors of the present invention, through a significant amount of in-depth research and various experimentations, developed a method of preventing the subsequent generation of a large amount of gas by initially completing the generation of gas in a lithium secondary battery as described below.

The present invention provides a manganese-based positive electrode active material allowing gas almost not to be generated during a subsequent cycle by entirely completing the generation of gas in an initial formation process and a lithium secondary battery comprising the same.

The present invention also provides a method of preparing a lithium secondary battery comprising the positive electrode active material.

DETAILED DESCRIPTION OF THE PREFERRED EMBODIMENT

According to an aspect of the present invention, there is provided a positive electrode active material represented by the following Chemical Formula 1:

$$Li\{Li_aMn_xM_{1-a-x-y}M'_y\}O_2 \qquad \text{[Chemical Formula 1]}$$

In which, $0<a\leq0.2$, $x>(1-a)/2$, and $0<y<0.2(1-a)$, and M is simultaneously applied by any one element or two or more elements selected from the group consisting of group 3 and 4 elements, and M' is a metal having an ion diameter of 70 pm or more with an oxidation number of 4 as well as a six-coordinate octahedral structure (specifically, any one element or two or more elements selected from the group consisting of titanium (Ti), vanadium (V), and iron (Fe) are simultaneously applied).

Also, M in Chemical Formula 1 may be simultaneously applied by any one element or two or more elements selected from the group consisting of manganese (Mn), nickel (Ni), and cobalt (Co).

Furthermore, M' in Chemical Formula 1 may be Fe.

Also, M' in Chemical Formula 1 may be added in an amount ranging from 0.01 mol % to 20 mol % based on a total amount of metals comprised in the positive electrode active material excluding lithium or may be added in an amount ranging from 0.05 mol % to 10 mol %.

The positive electrode active material may further comprise any one or two or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, lithium-containing olivine-type phosphate, lithium-containing manganese spinel, and oxide having other element(s) substituted or doped thereto.

At this time, the other element(s) may be any one element or two or more elements selected from the group consisting of aluminum (Al), magnesium (Mg), Mn, Ni, Co, chromium (Cr), V, and Fe.

The lithium-containing metal oxide may be comprised within an amount of 50 wt % based on a total amount of the positive electrode active material.

According to another aspect of the present invention, there is provided a positive electrode mixture comprising the positive electrode active material; a conductive agent; a binder; and a filler.

According to another aspect of the present invention, there is provided a lithium secondary battery comprising the positive electrode mixture.

The lithium secondary battery may be used as a unit cell of a battery module, a power source of a medium and large sized device.

At this time, the medium and large sized device may be a power tool; an electric vehicle (EV) comprising an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

According to another aspect of the present invention, there is provided a method of preparing a lithium secondary battery comprising:

preparing a positive electrode active material represented by the following Chemical Formula 1 (S1), $$Li\{Li_aMn_xM_{1-a-x-y}M'_y\}O_2 \qquad \text{[Chemical Formula 1]}$$

In which, $0<a\leq0.2$, $x>(1-a)/2$, and $0<y<0.2(1-a)$, and M is simultaneously applied by any one element or two or more elements selected from the group consisting of group 3 and 4 elements, and M' is a metal having an ion diameter of 70 pm or more with an oxidation number of 4 as well as a six-coordinate octahedral structure (specifically, any one element or two or more elements selected from the group consisting of titanium (Ti), vanadium (V), and iron (Fe) are simultaneously applied);

preparing a positive electrode by disposing the positive electrode active material prepared in (S1) step on a positive electrode collector to prepare a lithium secondary battery comprising the positive electrode (S2);

performing a formation process charging the lithium secondary battery prepared in (S2) step at a voltage ranging from 4.4 V to 5.0 V based on a positive electrode potential (S3); and performing a degassing process for removing gas in the lithium secondary battery after the formation process of (S3) step (S4).

At this time, M in Chemical Formula 1 may be simultaneously applied by any one element or two or more elements selected from the group consisting of manganese (Mn), nickel (Ni), and cobalt (Co).

Also, M' in Chemical Formula 1 may be Fe.

Furthermore, M' in Chemical Formula 1 may be added in an amount ranging from 0.01 mol % to 20 mol % based on a total amount of metals comprised in the positive electrode active material excluding lithium.

Also, M' in Chemical Formula 1 may be added in an amount ranging from 0.05 mol % to 10 mol % based on the total amount of metals comprised in the positive electrode active material excluding lithium.

According to the present invention, there is provided a positive electrode active material comprising a layer-structured lithium compound, and a lithium secondary battery comprising the same. As a result, it will help to reduce problems caused by gas generated during a subsequent cycle by entirely completing the generation of gas in an initial formation process. Therefore, the lithium secondary battery according to the present invention may have improved safety and lifetime characteristics as well as improved processability and capacity.

DETAILED DESCRIPTION OF THE PREFERRED EMBODIMENT

Figure 1:
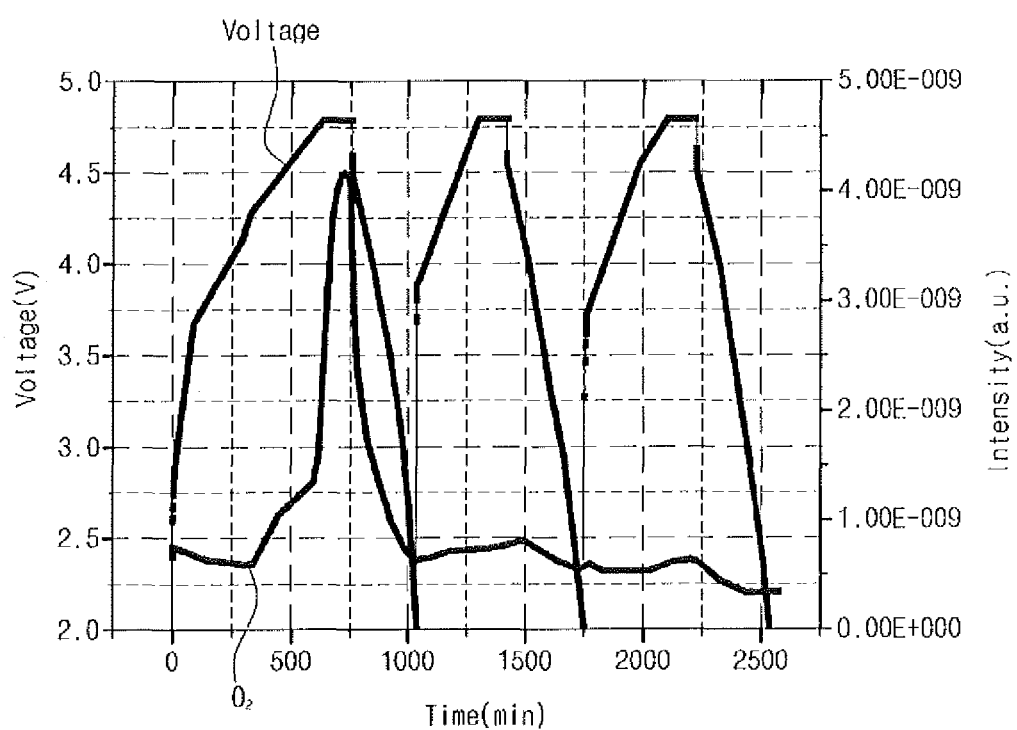
FIG. 1 is a graph showing a degree of oxygen generation according to charge and discharge of a secondary battery obtained from an Example of the present invention.

Hereinafter, the present invention will be described in detail.

According to the present invention, a positive electrode active material represented by the following Chemical Formula 1 is provided and thus, generation of gas may be entirely completed in a formation process according to a first charge and discharge by accelerating the generation of gas during the preparation of a layer-structured lithium compound.

$$Li\{Li_aMn_xM_{1-a-x-y}M'_y\}O_2 \quad \text{[Chemical Formula 1]}$$

In which, $0<a\leq0.2$, $x>(1-a)/2$, and $0<y<0.2(1-a)$, and M is simultaneously applied by any one element or two or more elements selected from the group consisting of group 3 and 4 elements, and M' is one or more metals having an ion diameter of 70 picometer (pm) or more with an oxidation number of 4 as well as a six-coordinate octahedral structure (specifically, any one element or two or more elements selected from the group consisting of titanium (Ti), vanadium (V), and iron (Fe) are simultaneously applied).

A positive electrode active material represented by Chemical Formula 1 is formed by doping a portion of transition metal expressed as M in a layer-structured lithium manganese oxide represented by $Li(Li_aMn_xM_{1-a-x})O_2$ (where $0<a\leq0.2$, $x>(1-a)/2$, and M is simultaneously applied by any one element or two or more elements selected from the group consisting of group 3 and 4 elements) with a specific metal dopant (M').

The layer-structured lithium compound is a lithium transition metal oxide including manganese (Mn) as an essential transition metal, having a content of Mn greater than those of other transition metal(s), including lithium (Li) having an amount of moles equal to or more than that of moles of transition metal including Mn, and exhibiting high capacity while having characteristics of allowing gas, such as oxygen and carbon dioxide, to be released in a plateau potential range accompanied with lithium deintercalation during first charge in a high voltage range of 4.4 V or more based on a positive electrode potential.

Also, the layer-structured lithium compound is a material which may provide an additional lithium source by providing lithium ions consumed in an initial irreversible reaction on the surface of a negative electrode and by allowing lithium ions not used in the irreversible reaction in the negative electrode to be transferred to a positive electrode during subsequent discharge.

Mn included as an essential transition metal in the layer-structured lithium compound is comprised in an amount more than that of other metals (excluding lithium) and may be comprised in an amount ranging from 50 mol % to 80 mol % based on a total amount of metals excluding lithium. In the case that the Mn content is relatively low, stability may decrease, manufacturing costs may increase, and unique characteristics that belong only to the layer-structured lithium compound may be difficult to be exhibited. In contrast, in the case that the Mn content is relatively high, cycle stability may decrease.

M may be one or more selected from the group consisting of period 3 and 4 elements and in particular, may be any one or two or more of nickel (Ni), Mn, and cobalt (Co).

Also, the layer-structured lithium compound may have a predetermined range of plateau potential above an oxidation/reduction potential generated due to the changes in oxidation numbers of components in the positive electrode active material. Specifically, the layer-structured lithium compound may have a plateau potential range at about 4.4 V to about 4.8 V during (initial) charging at a high voltage of 4.4 V or more based on a positive electrode potential.

In the plateau potential range, gases (oxygen and carbon dioxide) may be generally released to balance oxidation/reduction while lithium is extracted. In the case that oxygen is released, a reaction generating two lithium ions may occur as below.

$$Li_2MnO_3 \rightarrow 2Li^+ + e^- + MnO_3$$

$$MnO_3 \rightarrow \tfrac{1}{2}O_2 + MnO_2$$

The above reactions are characteristics according to the structural changes of the layer-structured lithium compound and, in the case that these reactions insufficiently occur during initial charge, a large amount of gas may be continuously discharged during subsequent repetitive charge and discharge cycles.

The large amount of gas thus generated may be a serious threat to safety in the use of the battery and may be a cause of reducing the lifetime of the battery, e.g., increasing the resistance of a cell.

According to the present invention, the positive electrode active material expressed as Chemical Formula 1 is provided by doping with the metal dopant (M') capable of accelerating the generation of gas through the acceleration of stable structural transition in the layer-structured lithium compound.

The metal dopant (M') is included in the layer-structured lithium compound to complete the generation of gas by generating a large amount of gas during a first cycle of the battery and thus, may act to allow gas almost not to be generated during subsequent repetitive charge and discharge cycles.

The above effect may be generated by allowing the metal dopant (M') to be included in the layer-structured lithium compound to promote structural changes in the layered structure, and for this purpose, the metal dopant (M') may be a metal having an ion diameter of 70 pm or more with an oxidation number of 4 as well as a six-coordinate octahedral structure.

M' having the foregoing characteristics may be included in the layer-structured lithium compound to contribute to the instability of the layer-structured lithium compound during charging at a voltage of 4.4 V or more based on a positive electrode voltage, and thus, may accelerate the generation of gas due to the structural transition.

That is, the ion diameter of transition metal may decrease while excessive Li may be extracted during charging the positive electrode active material according to Chemical Formula 1 at a voltage of 4.4 V or more based on the positive electrode voltage and the M' element may further accelerate a phenomenon, such as the resulting changes in a lattice, and thus, the structural changes in the layer-structured lithium compound may be entirely completed at an initial period and the resulting generation of gas may also be entirely completed during first charge and discharge.

Specifically, the metal dopant (M') having an ion diameter of 70 pm or more with an oxidation number of 4 as well as a six-coordinate octahedral structure may be any one selected from the group consisting of Ti, V, and Fe, and more particularly, may be Fe.

The metal dopant (M') may be added in an amount ranging from 0.01 mol % to 20 mol % based on the total amount of metals comprised in Chemical Formula 1 excluding lithium and particularly, may be comprised in an amount ranging from 0.05 mol % to 10 mol %.

In the case that M' is added in an amount of less than 0.01 mol %, an effect at a level required in the present invention may not be manifested, and, in the case that M' is added in an amount of greater than 20 mol %, there may be limitations in capacity and cycle stability of the battery.

Meanwhile, the positive electrode active material according to the present invention may be a mixture of any one or two or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, lithium-containing olivine-type phosphate, lithium-containing manganese spinel, and oxide having other element(s) substituted or doped thereto, in addition to the positive electrode active material expressed as Chemical Formula 1. The lithium-containing metal oxide may be comprised within an amount of 50 wt % based on a total weight of the positive electrode active material in view of exhibiting the effect targeted in the present invention.

Herein, the other element(s) may be any one element or two or more elements selected from the group consisting of aluminum (Al), magnesium (Mg), Mn, Ni, Co, chromium (Cr), V, and Fe.

The present invention may also provide a positive electrode mixture further comprising a conductive agent, a binder, and a filler to the positive electrode active material.

The conductive agent may be typically added in an amount ranging from 1 wt % to 50 wt % based on the total weight of the mixed positive electrode active material. The conductive agent is not particularly limited so long as it does not generate chemical changes in the battery as well as having conductivity. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder and nickel powder; conductive whiskers such as zinc oxide whiskers and potassium titanate whiskers; conductive oxide such as titanium oxide; a conductive material such as a polyphenylene derivative, etc.

The binder is a component that assists in bonding between the positive electrode active material and the conductive agent and bonding with respect to a current collector, and may be typically added in an amount ranging from 1 wt % to 50 wt % based on the total weight of the positive electrode active material. Examples of the binder may be polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluorine rubber, various copolymers, etc.

The filler is selectively used as a component that prevents expansion of the positive electrode and is not particularly limited so long as it does not generate chemical changes in the battery as well as being a fibrous material. Examples of the filler may be olivine-based polymers such as polyethylene and polypropylene; and fibrous materials such as glass fibers and carbon fibers.

The present invention may also provide a positive electrode having the positive electrode mixture comprised on the current collector.

A secondary battery according to the present invention may comprise the foregoing positive electrode active material. Hereinafter, a method of preparing a secondary battery according to the present invention will be described.

First, a positive electrode active material expressed as the following Chemical Formula 1 is prepared by applying a metal dopant having an ion diameter of 70 pm or more with an oxidation number of 4 as well as a six-coordinate octahedral structure to a layer-structured lithium compound expressed as $Li(Li_aMn_xM_{1-a-x})O_2$ (where $0<a\leq0.2$, $x>(1-a)/2$, and M is simultaneously applied by any one element or two or more elements selected from the group consisting of period 3 and 4 elements) (S1).

$$Li\{Li_aMn_xM_{1-a-x-y}M'_y\}O_2 \qquad \text{[Chemical Formula 1]}$$

where $0<a\leq0.2$, $x>(1-a)/2$, and $0<y<0.2(1-a)$, and M is simultaneously applied by any one element or two or more elements selected from the group consisting of period 3 and 4 elements, and M' is a metal having an ion diameter of 70 pm or more with an oxidation number of 4 as well as a six-coordinate octahedral structure (specifically, any one element or two or more elements selected from the group consisting of titanium (Ti), vanadium (V), and iron (Fe) are simultaneously applied).

At this time, a content of the metal dopant (M') may be added in an amount ranging from 0.01 mol % to 20 mol % based on a total amount of metals excluding lithium.

A method of preparing the positive electrode active material in Chemical Formula 1 is not particularly limited, and a positive electrode active material having the metal dopant (M') introduced thereinto may be prepared by adding a precursor containing the metal dopant and reacting under the same conditions as those used in methods of preparing a typical positive electrode active material, e.g., a liquid phase method, such as a coprecipitation or sol-gel method, and a gas phase method such as a spray pyrolysis method.

The positive electrode active material expressed as Chemical Formula 1 according to the present invention may further comprise other lithium-containing metal oxides and conductive agent.

Thereafter, the positive electrode active material expressed as Chemical Formula 1 thus prepared is disposed on a positive electrode collector to prepare a positive electrode and a lithium secondary battery comprising the positive electrode is prepared by using a known method (S2).

A formation process charging the lithium secondary battery prepared by the foregoing method at a relatively high voltage of 4.4 V or more based on a positive electrode potential is performed (S3).

In operation S3, structural changes in the positive electrode active material according to Chemical Formula 1 may occur, and, as a result, a large amount of gas, such as oxygen or carbon dioxide, may be generated and high capacity of the positive electrode active material may be simultaneously manifested. That is, in operation S3, the battery is activated by being charged at a relatively high voltage above a plateau potential in the battery formation process.

Since the structural transition of the positive electrode active material expressed as Chemical Formula 1 is completed in a first cycle through the formation process in operation (S3) and the resulting generation of gas is also completed, an effect of significantly reducing an amount of gas generated may be obtained even in the case that charging and discharging is performed at the above voltage level during a subsequent cycle.

The formation process as in operation (S3) may be repeatedly performed one or more times.

Also, operation (S3) is performed at a relatively high voltage above the plateau potential, and may be performed at 4.4 V or more based on the positive electrode potential and particularly, may be performed at 4.45 V or more in order to secure higher capacity.

With respect to the lithium secondary battery after the formation process in operation S3, gas in the battery is completely removed through a degassing process in order to release a large amount of the generated gas (S4). The degassing process may be performed one or more times.

The lithium secondary battery prepared through the foregoing operations may have high capacity and may have improved safety and lifetime characteristics, because the amount of gas generated during a subsequent charge and discharge process is significantly reduced.

The lithium secondary battery prepared through the foregoing operations may exhibit high capacity in the case that the lithium secondary battery is charged under a high voltage condition for each subsequent operating cycle. However, since an electrolyte and other units stably operable at a high voltage for this purpose may not be realized at the moment, the charge and discharge process at a high voltage may be typically performed only in the battery formation process for the safety and stable cycle of the battery, and thereafter, the battery may be generally allowed to be operated at a voltage below the plateau potential. However, the present invention is not limited thereto.

Meanwhile, the lithium secondary battery comprising the positive electrode active material of the present invention is composed of a positive electrode formed of a positive electrode mixture and a current collector, a negative electrode formed of a negative electrode mixture and a current collector, and a separator capable of blocking electron conduction between the positive electrode and the negative electrode and conducting lithium ions, and an electrolyte for the conduction of lithium ions is comprised in voids of the electrodes and the separator.

In general, the positive electrode and the negative electrode are prepared by drying after respectively coating the current collector with a mixture of an electrode active material, a conductive agent, and a binder, and a filler may be further added to the mixture if necessary.

The lithium secondary battery according to the present invention may be prepared according to a typical method known in the art. Specifically, the lithium secondary battery may be prepared by inserting a porous separator between the positive electrode and the negative electrode, and introducing a non-aqueous electrolyte.

The secondary battery according to the present invention may not only be used in a battery cell used as a power source of a small device, but may also be used as a unit cell in a medium and large sized battery module comprising a plurality of battery cells.

Preferred examples of the medium and large sized device may be a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system, but the medium and large sized device is not limited thereto.

Hereinafter, the present invention will be described in detail, according to specific examples. However, the following examples are merely presented to exemplify the present invention, and the scope of the present invention is not limited thereto.

EXAMPLES

Preparation of Positive Electrode $Li_{1.2}Mn_{0.5}(CoNi)_{0.25}Fe_{0.05}O_2$ was used as a positive electrode active material and was added in an amount of 87 wt % based on a total weight of a positive electrode mixture. 7 wt % of Denka black as a conductive agent and 6 wt % of polyvinylidene fluoride (PVDF) as a binder were added to N-methylpyrrolidone (NMP) to prepare a slurry. An aluminum (Al) foil as a positive electrode collector was coated with the slurry and then rolled and dried to prepare a positive electrode for a lithium secondary battery.

Preparation of Lithium Secondary Battery

The positive electrode thus prepared was comprised, a porous polyethylene separator was disposed between the positive electrode and an anode based on lithium, and a lithium electrolyte was injected to prepare a coin-type lithium half cell.

Activation Process

As a formation process, the coin-type lithium secondary battery was initially charged at 4.6 V based on a positive electrode potential and then discharged at 2.5 V. Thereafter, gas generated in-situ was analyzed and the results thereof are presented in FIG. 1.

Comparative Example

A positive electrode and a lithium secondary battery were prepared in the same manner as the Example except that $Li\{Li_{0.2}Mn_{0.5}Ni_{0.3}Co_{0.3}\}O_2$ was used as a positive electrode active material. Then, a formation process was performed in the same manner as the Example and the results thereof are illustrated in FIG. 1.

Figure 2:
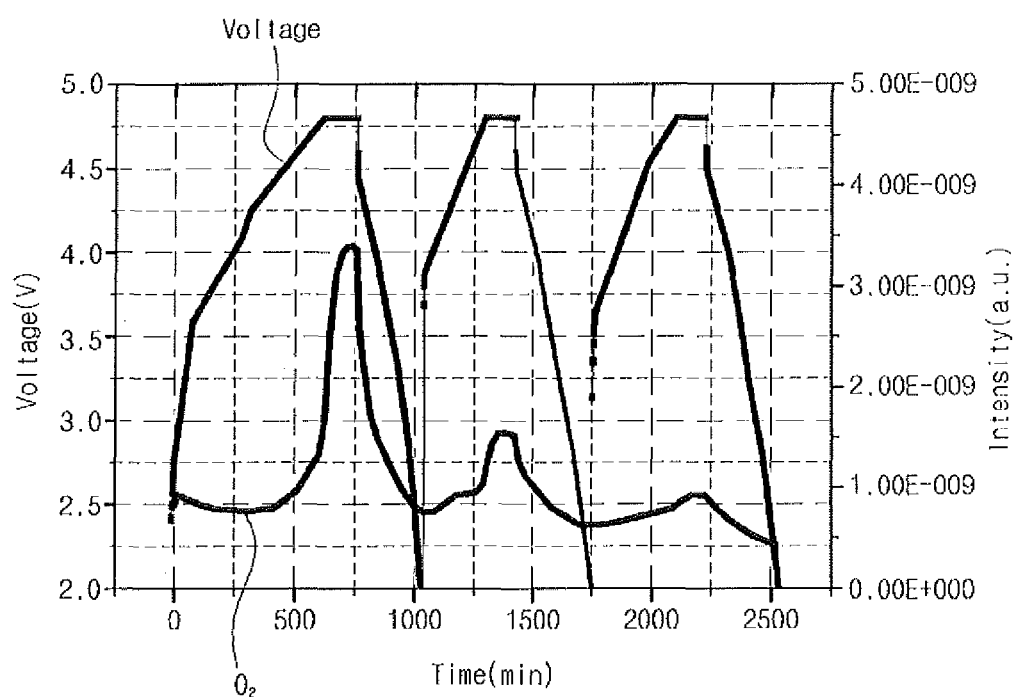
FIG. 2 is a graph showing a degree of oxygen generation according to charge and discharge of a secondary battery obtained from a Comparative Example of the present invention.

Generation of oxygen ($O_2$) was measured by using a differential electrochemical mass spectrometry (DEMS) apparatus detecting the generation of gas while charging and discharging was performed on the secondary batteries according to the Example and Comparative Example, and the results thereof are illustrated in FIGS. 1 and 2.

Voltage values ("4.6 V", etc.) described in the present specification denoted positive electrode potentials in a half cell unless specially defined, and voltage values in a full cell may be about 0.05 V to about 0.1 V lower than that of the half cell according to a negative electrode potential. For example, 4.6 V based on a half cell may become about 4.5 V to about 4.55 V (although changed according to the negative electrode) as a full cell voltage in the case of using a graphite-based negative electrode.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being comprised in the present invention.

What is claimed is:

1. A lithium secondary battery comprising a positive electrode active material represented by the following Chemical Formula 1:

$$Li\{Li_aMn_xM_{1-a-x-y}M'_y\}O_2 \qquad \text{[Chemical Formula 1]}$$

where $0<a\leq 0.2$, $x>(1-a)/2$, and $0.05\leq y<0.2(1-a)$, and M is simultaneously applied by two elements of nickel (Ni) and cobalt (Co), and M' is a metal having an ion diameter of 70 pm or more with an oxidation number of 4 as well as a six-coordinate octahedral structure, wherein the positive electrode active material further comprises any one or two or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, lithium-containing olivine-type phosphate, lithium-containing manganese spinel, and lithium-containing metal oxide having other element(s) substituted or doped thereto;

wherein the battery is prepared by performing a formation process comprising charging at a voltage from 4.4V to 5.0 V based on a positive electrode potential and degassing after the formation process; and wherein a generation of gas is completed in an initial formation process and the gas is not generated during a subsequent charge and discharge cycle.

2. The lithium secondary battery of claim 1, wherein M' in Chemical Formula 1 is simultaneously applied by any one element or two or more elements selected from the group consisting of titanium (Ti), vanadium (V), and iron (Fe).

3. The lithium secondary battery of claim 2, wherein M' in Chemical Formula 1 is Fe.

4. The lithium secondary battery of claim 1, wherein M' in Chemical Formula 1 is added in an amount ranging from 0.01 mol % to 20 mol % based on a total amount of metals comprised in the positive electrode active material excluding lithium.

5. The lithium secondary battery of claim 1, wherein M' in Chemical Formula 1 is added in an amount ranging from 0.05 mol % to 10 mol % based on the total amount of metals comprised in the positive electrode active material excluding lithium.

6. The lithium secondary battery of claim 1, wherein the other element(s) is any one element or two or more elements selected from the group consisting of aluminum (Al), magnesium (Mg), Mn, Ni, Co, chromium (Cr), vanadium (V), and Fe.

7. The lithium secondary battery of claim 1, wherein the lithium-containing metal oxide is present in an amount less than or equal to 50 wt % based on a total amount of the positive electrode active material.

8. The lithium secondary battery of claim 1, wherein the lithium secondary battery is used as a unit cell of a battery module, a power source of a medium or large sized device.

9. The lithium secondary battery of claim 8, wherein the medium or large sized device is a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

* * * * *